(12) United States Patent
Brito et al.

(10) Patent No.: US 7,835,044 B2
(45) Date of Patent: Nov. 16, 2010

(54) METHOD FOR TETRAHEDRAL INTERPOLATION COMPUTATIONS USING DATA-LEVEL PARALLELISM

(75) Inventors: Alejandro Enrique Brito, Mountain View, CA (US); Doron Kletter, San Mateo, CA (US)

(73) Assignee: Xerox Corporation, Norwalk, CT (US)

( * ) Notice: Subject to any disclaimer, the term of this patent is extended or adjusted under 35 U.S.C. 154(b) by 1166 days.

(21) Appl. No.: 11/410,626

(22) Filed: Apr. 25, 2006

(65) Prior Publication Data
US 2007/0247648 A1     Oct. 25, 2007

(51) Int. Cl.
*H04N 1/46* (2006.01)
*G03F 3/08* (2006.01)
*G09G 5/02* (2006.01)
*G09G 5/00* (2006.01)

(52) U.S. Cl. .................. 358/518; 358/520; 358/523; 358/525; 345/604; 345/606

(58) Field of Classification Search .......... 358/515, 358/516, 518, 525; 382/162.167, 276
See application file for complete search history.

(56) References Cited

U.S. PATENT DOCUMENTS

| | | | |
|---|---|---|---|
| 5,581,376 A | * | 12/1996 | Harrington .............. 358/518 |
| 5,751,845 A | * | 5/1998 | Dorff et al. ............. 382/162 |
| 5,751,926 A | * | 5/1998 | Kasson et al. ........... 345/419 |
| 6,031,642 A | * | 2/2000 | Vondran, Jr. ............ 358/525 |
| 7,483,174 B2 | * | 1/2009 | Tadas ..................... 358/1.9 |
| 2004/0049497 A1 | | 3/2004 | Curry et al. |
| 2004/0061902 A1 | * | 4/2004 | Tang et al. .............. 358/3.01 |
| 2004/0109185 A1 | * | 6/2004 | Hung et al. .............. 358/1.9 |

OTHER PUBLICATIONS

European Search Report dated Sep. 23, 2009 for EP Application 07106837.3.

* cited by examiner

*Primary Examiner*—Mark K Zimmerman
*Assistant Examiner*—Haris Sabah
(74) *Attorney, Agent, or Firm*—Tuesday A. Kaasch; Kermit D. Lopez; Luis M. Ortiz

(57) ABSTRACT

A system and method for tetrahedral interpolation computations using data-level parallelism that takes advantage of data-level parallelism in media processors. If the tetrahedron points in a 3D lookup table are packed together in a memory, the interpolation computation can be implemented without extra instructions to unpack them. An algebraic manipulation of the interpolation equation allows computing the difference on the fraction coefficients instead of the tetrahedron node values. Not only will this technique preserve the full precision without over or underflow, but the packed data from the 3D lookup can be used directly, thereby allowing a faster implementation of the color space transformation overall and implementing as part of a direct-copy image path on a media processor. Such a system and method allows the implementation of the direct copy pipeline to function at the required performance rate as requested by a customer specification while obtaining the required product design speed.

2 Claims, 6 Drawing Sheets

METHOD FOR TETRAHEDRAL INTERPOLATION COMPUTATIONS USING DATA-LEVEL PARALLELISM

TECHNICAL FIELD OF THE INVENTION

Embodiments are related to data-processing methods and systems. Embodiments are also related to image-processing devices and techniques. Embodiments are additionally related to color space transformation in image-processing applications.

BACKGROUND OF THE INVENTION

In color space transformations based on three-dimensional (3D) lookup with tetrahedral interpolation, the interpolation stage calculates the estimated [CMYK] output value based on the given CMYK values of the nearest four nodes to the current location in the input 3D space. Such a methodology assumes that the color transformation is relatively smooth and that the nodes are placed close enough such that the transformation is approximately piece-wise linear between adjacent nodes.

The approximation level (and the resulting color transformation accuracy) is generally dependent on the number of nodes, their relative positions, and the non-linearity of the color transformation in a given neighborhood. The interpolation computation equation in accordance with one existing method can be described as follows:

$$\text{Output}_i = 1/128(128*P0_i + X\!frc*\Delta X_i + Y\!frc*\Delta Y_i + Z\!frc*\Delta Z_i)$$

Where $i \in \{C, M, Y, K\}$.

The above equation assumes that the CMYK node difference values ($\Delta X, \Delta Y, \Delta Z$) are represented as signed 8-bit numbers, and the fractional position values (Xfrc, Yfrc, Zfrc) within a given tetrahedron are represented as unsigned 8-bit numbers after the subsequent rank ordering described below.

The above equation can be computed per output color component (C, M, Y, and K), where the node delta values ($\Delta X, \Delta Y, \Delta Z$) are dependent on the tetrahedron containing the mapped input point in the input color space (e.g., in (L, a, b) or (Y, Cb, Cr)).

Note that, in general, the chrominance values (a, b) or (Cb, Cr) are signed numbers while the luminance values (L or Y) are unsigned numbers.

In one application, each cube of the input color space can be divided into six non-overlapping tetrahedrons of the same size. Alternatively, the space can be divided into five tetrahedrons (i.e., a fewer number), but in this case the center tetrahedron has a larger size and this somewhat complicates the calculations. Thus, the focus can be on the six tetrahedron case. Table 1 below illustrates the node value delta computation for all possible tetrahedrons with reference to the existing method.

TABLE 1

| Tetrahedron | Order in which the node values Δs are computed | | |
|---|---|---|---|
| | ΔX | ΔY | ΔZ |
| 1 | P1-P0 | P2-P1 | P3-P2 |
| 2 | P1-P0 | P3-P2 | P2-P1 |
| 3 | P2-P1 | P3-P2 | P1-P0 |
| 4 | P2-P1 | P1-P0 | P3-P2 |
| 5 | P3-P2 | P1-P0 | P2-P1 |
| 6 | P3-P2 | P2-P1 | P1-P0 |

The specific tetrahedron in which the input location resides can be easily determined by simply ordering the fractional delta values (Xfrc, Yfrc, Zfrc) in rank order. The interpolation algorithm computes the output value using rounding and limiting the final result to the preferred output range (e.g., between 0 and 255 for 8-bit output). After the interpolated CMYK point has been calculated, each of its color components can be used as an address to four different 1D lookup tables. These lookup tables provide a means to linearize the main CMYK color interpolation table of node values with respect to the individual {C, M, Y, K} color response. In addition, the 1D lookup tables can be used to compensate for changes in the individual {C, M, Y, K} tone reproduction curve as the machine drifts over time and/or the level of toner/ink is depleted without having to re-calibrate the node positions of the main color tables. The values accessed from the four lookup tables represent the adjusted CMYK values that comprise the final output value.

The entire color interpolation method in accordance with one existing method can then be described as following: for each output channel (C, M, Y, and K), four output values representing the nearest nodes to the mapped Lab or YCC input point are looked-up in a table and used in a tetrahedral interpolation step to find the approximated CMYK output value. The resulting output value is then adjusted by a byte-to-byte mapping using four 1-D lookup tables.

Color space transformation via 3D Lookup table with tetrahedral interpolation is a well-known algorithm for converting from one color space (e.g., RGB or Lab) to another (e.g., CMYK for printing). In software implementations on general purpose processors, for example, the computational steps are processed in sequential fashion, one color separation at a time. Although the fractional position within a specific tetrahedron is the same for each color separation, the node values are different, thus requiring individual calculations per color separation. In contrast, the algorithm can be efficiently implemented in hardware by packing the data and processing the transformation of the color channels in parallel. By taking advantage of this property, it can be demonstrated that certain media processors with data-level parallelism can deliver higher-performance color space transformation relative to general purpose processors and common hardware implementations.

One known prior art application involves interpolation techniques for improved efficiency and speed in performing color space conversions. In such a case, a radial interpolation technique can accomplish an interpolation by generating successive subcubes. A value of a vertex of the final subcube generated can be used as the result of the interpolation. Subcubes are generated by averaging a selected vertex value with the vertex values of each of the remaining vertices. A pruned radial interpolation technique employs a subset of the vertex values of the initially selected cube to generate the result of the interpolation, thereby improving upon the efficiency of the radial interpolation. A tetrahedral interpolation technique accomplishes an interpolation by generating successive subcubes.

A value of a vertex of the final subcube generated can be used as the result of the interpolation. Subcubes are generated by applying a mathematical relationship which allows computation of subcube vertex values through a series of logical AND, logical OR and averaging operations. A pruned tetrahedral interpolation technique employs a subset of the vertex values of the initially selected cube to generate the result of the interpolation, thereby improving upon the efficiency of the tetrahedral interpolation. A common hardware implementation of pruned radial interpolation and pruned tetrahedral interpolation uses the common hardware structure of the two techniques with multiplexing of the input vertex values to allow performance of either a pruned radial interpolation or a pruned tetrahedral interpolation. Non-symmetric pruned radial and Non-symmetric pruned tetrahedral interpolation permit interpolation using interpolation data values distributed throughout the color space with a resolution that varies according to characteristics of the color space. Multiplexing of the interpolation data values to the non-symmetric pruned radial interpolation hardware and to the non-symmetric pruned tetrahedral interpolation hardware allows for a common hardware implementation.

Another prior art technique involves tetrahedral interpolation by rewriting the interpolation in terms of ordered differentials and color differences to lower the computational complexity.

One of the problems with these prior art techniques is that such methodologies and related devices are inefficient and cannot be easily adapted to a wide range of image processing applications. In order to overcome these problems, it is believed that the embodiments disclosed herein can be implemented for increased efficiency in both processing and hardware applications.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the present invention to provide for improved data-processing systems and methods.

It is another aspect of the present invention to provide for improved image-processing systems and methods.

It is a further aspect of the present invention to provide for an efficient method for tetrahedral interpolation computations using data-level parallelism by taking advantage of media processor parallel instructions while providing a more efficient calculation of the approximated output point by delivering higher-performance color space transformation in image-processing applications The aforementioned aspects and other objectives and advantages can now be achieved as described herein. A system and method for tetrahedral interpolation computations using data-level parallelism that takes advantage of data-level parallelism in media processors is claimed. If the tetrahedron points in a 3D lookup table are packed together in a memory, the interpolation computation can be implemented without extra instructions to unpack them. An algebraic manipulation of the interpolation equation allows computing the difference on the fraction coefficients instead of the tetrahedron node values. Not only will this technique preserve the full precision without over or underflow, but the packed data from the 3D lookup can be used directly as is (without unpacking), thereby allowing a faster implementation of the color space transformation overall and implementing as part of a direct-copy image path on a media processor. Such systems and methods allow the implementation of the direct copy pipeline to function at the required performance rate as requested by a customer specification while obtaining the required product design speed.

BRIEF DESCRIPTION OF THE DRAWINGS

Features, aspects and advantages of the present invention will become better understood with regard to the following description, appended claims, and accompany drawings where:

DETAILED DESCRIPTION OF THE INVENTION

The particular values and configurations discussed in these non-limiting examples can be varied and are cited merely to illustrate the aspects of the present invention and are not intended to limit the scope of the invention.

Figure 1:
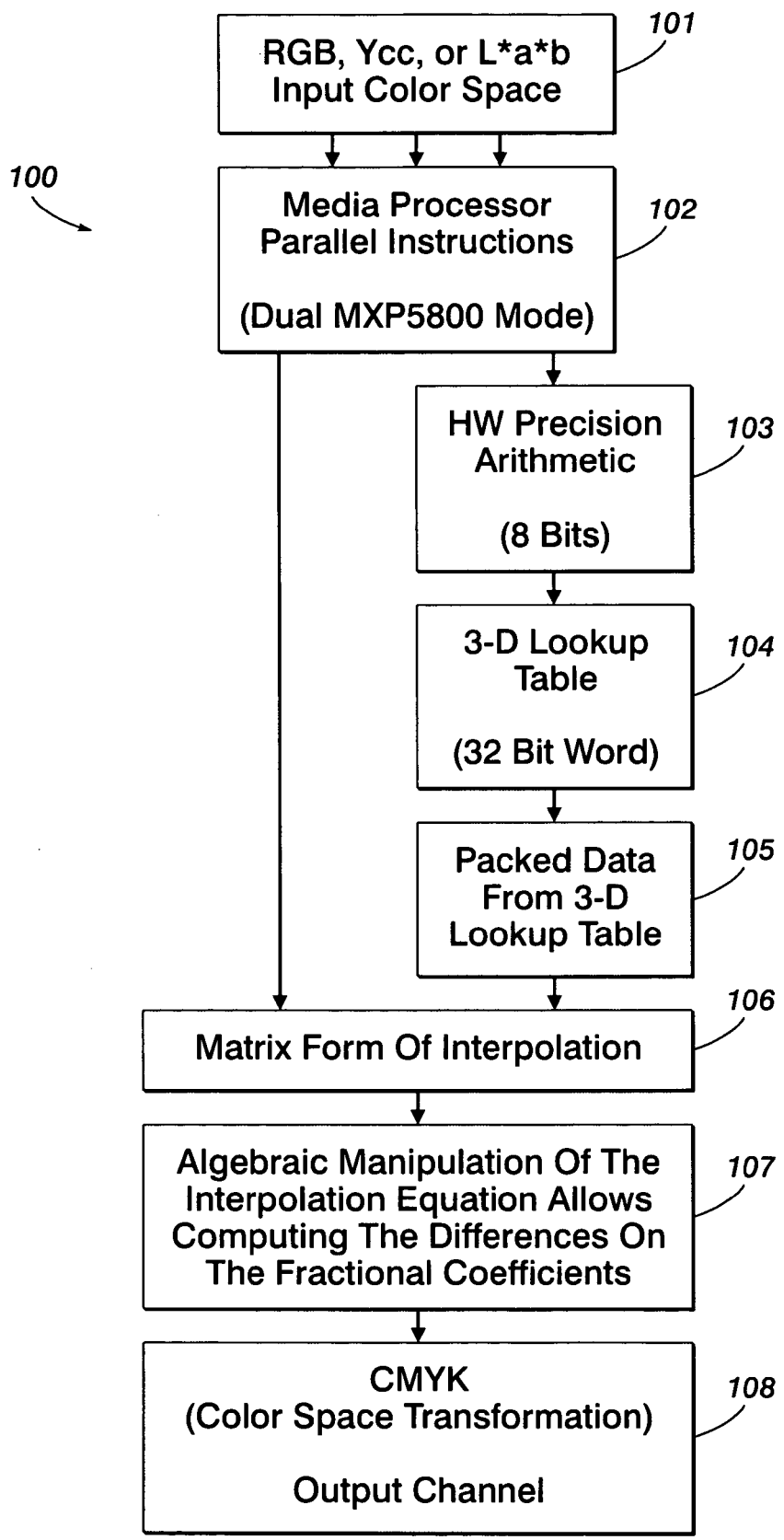
FIG. 1 illustrates a block diagram depicting a basic functional architecture for tetrahedral interpolation computations using data-level parallelism in accordance with a preferred embodiment.

Referring to FIG. 1, a block diagram of a system 100 is illustrated, which depicts the basic functional architecture of tetrahedral interpolation computations using data-level parallelism in accordance with a preferred embodiment. Color space transformation via 3D Lookup table with tetrahedral interpolation is a well-known algorithm for converting from one input color space (e.g., RGB, Ycc, or Lab) 101 to another (e.g., CMYK 108 for printing). The data-level parallelism occurs in media processors (such as INTEL MXP5800) 102, if the tetrahedron points to usually 8-bit values per color channel with HW precision arithmetic 103, and the 3D lookup table 104 are packed together in memory as one 32-bit word. The interpolation computation can then be implemented without extra instructions to unpack them. A matrix form of interpolation can be obtained by configuring the media processor parallel instructions and the packed data from the 3D lookup table 105 and thus can be implemented within the existing HW precision without any loss of accuracy. An algebraic manipulation of the interpolation equation can then be applied to enable computation of the differences over fractional coefficients 107. A color space transformation can then be applied to output channel 108 to produce the desired CMYK outputs.

Figure 2:
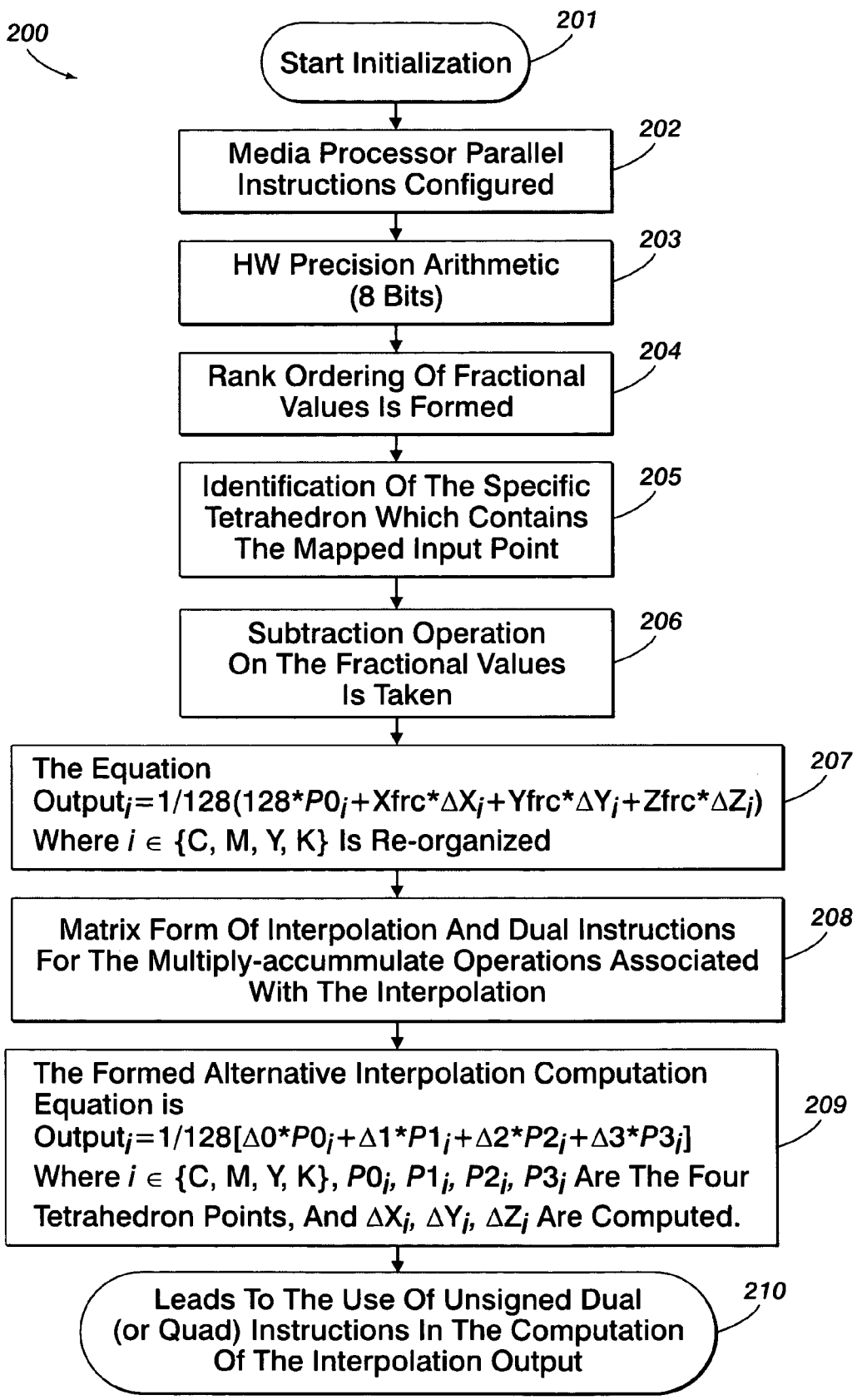
FIG. 2 illustrates a flowchart of operations depicting logical operational steps for tetrahedral interpolation computations using data-level parallelism in accordance with a preferred embodiment.

Referring to FIG. 2, a high-level flow chart 200 is illustrated depicting logical operational steps for implementing a basic functional architecture of tetrahedral interpolation computations utilizing data-level parallelism in accordance with the preferred embodiment. As indicated at block 201, a first process can be initialized. Thereafter, as depicted at block 202, the media processors' parallel instructions can be configured using fixed HW precision arithmetic (e.g., 8-bits) as illustrated at block 203. By rank-ordering of the fractional values as illustrated at block 204, the process can practically guarantee that the delta of the fractions is always a positive result due to the subtraction of a small number from a large number, and thus can be used to identify the specific tetrahedron which contains the mapped input point as depicted at block 205. This applies for any tetrahedron case. Thereafter, the subtraction on the fractional values, rather than the node values, is taken as indicated at block 206. Subsequently, the equation Output$_i$=1/128 (128*P0$_i$+Xfrc*ΔX$_i$+Yfrc*ΔY$_i$+Zfrc*ΔZ$_i$), where i∈{C, M, Y, K} can be re-organized as depicted at block 207 by matrix form of interpolation with the use of dual instructions for multiply-accumulate operations associated with the interpolation as illustrated at block 208. The formed alternative interpolation computation equation is provided as follows: $\text{Output}_i = 1/128 \ [\Delta 0 * P0_i + \Delta 1 * P1_i + \Delta 2 * P2_i + \Delta 3 * P3_i]$, where $i \in \{C, M, Y, K\}$, $P0_i$, $P1_i$, $P2_i$, $P3_i$ represents the four tetrahedron points and the values $\Delta 0$, $\Delta 1$, $\Delta 2$, $\Delta 3$ are computed in block 209. In the end, this leads to the use of unsigned dual (or quad) instructions in the computation of the interpolation output as indicated at block 210.

Figure 3A:
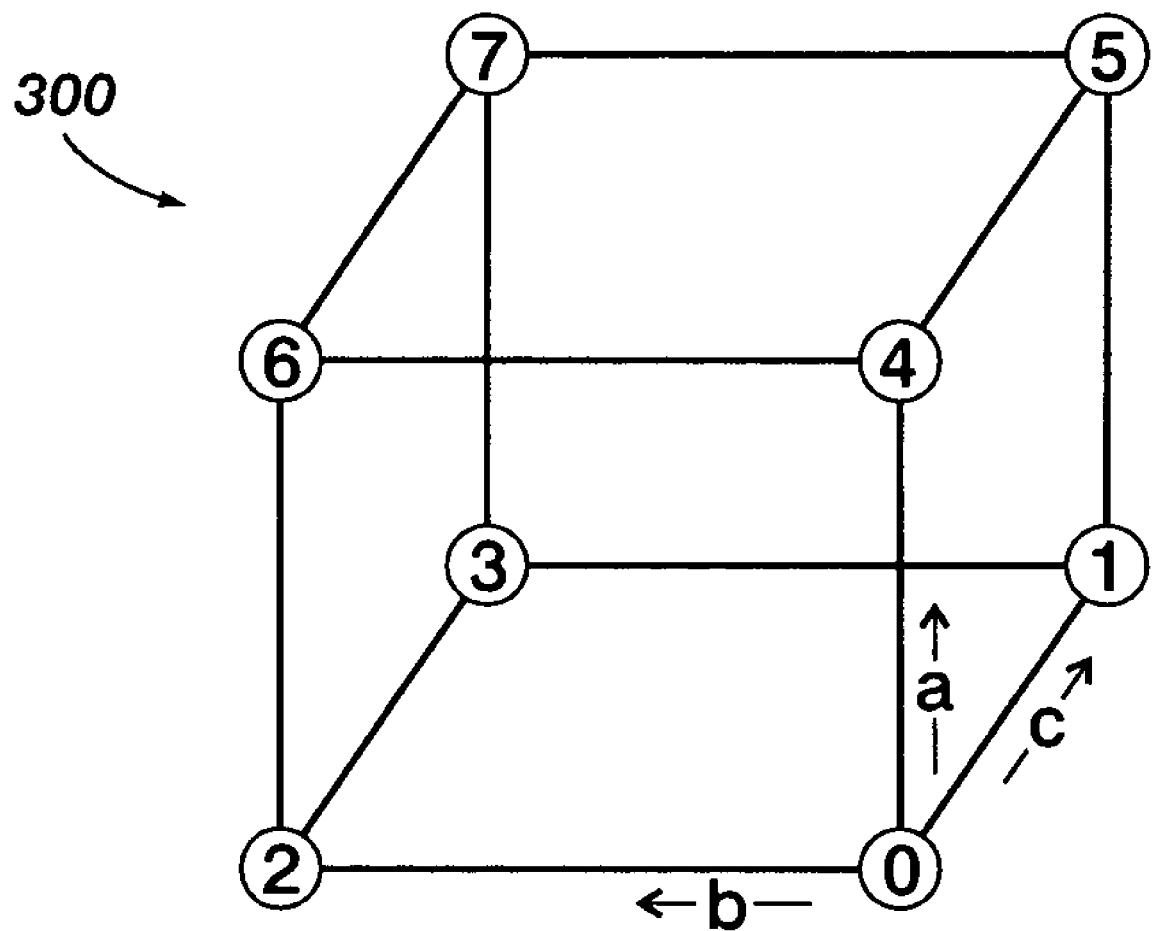
FIGS. 3a-3e illustrates interpolation volumes in accordance with preferred embodiments
Figure 3B:
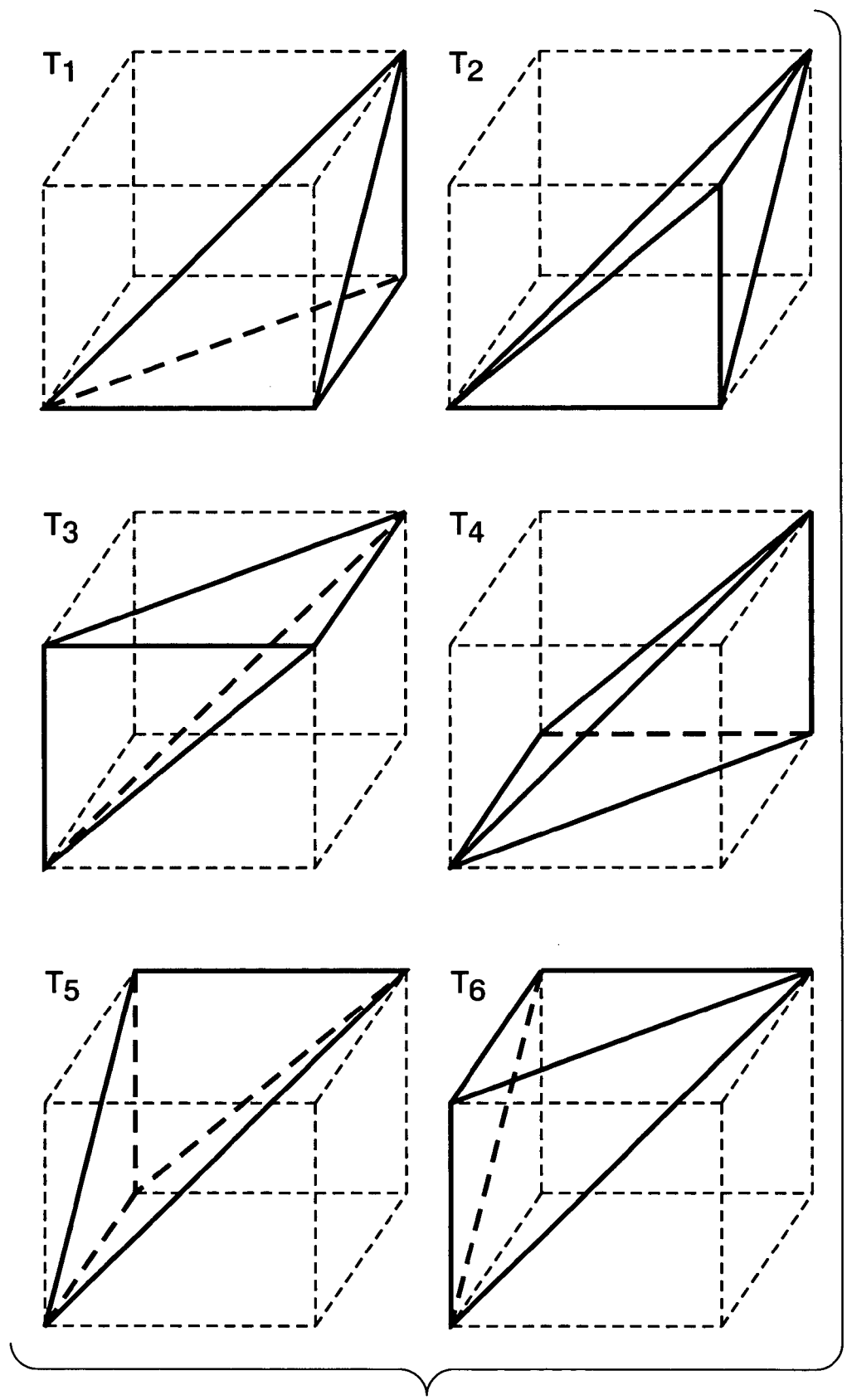
Figure 3C:
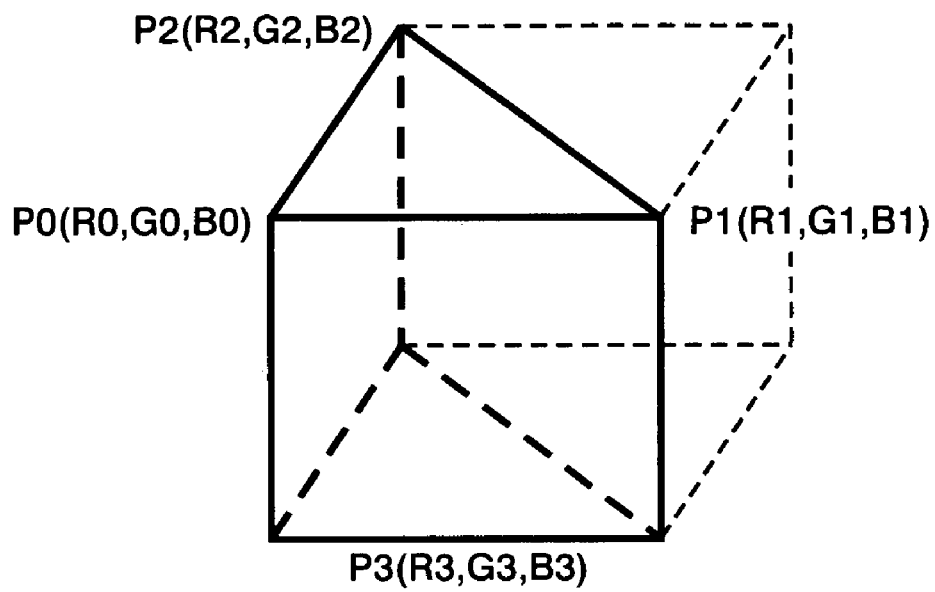
Figure 3D:
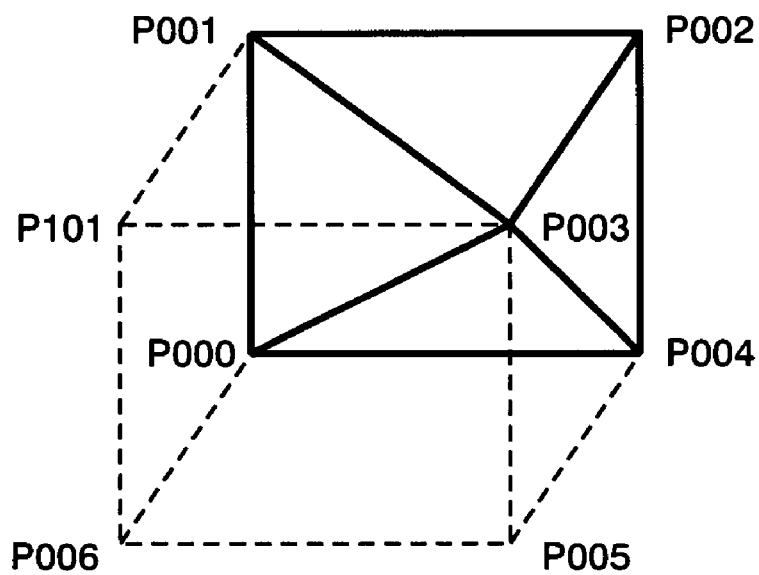
Figure 3E:
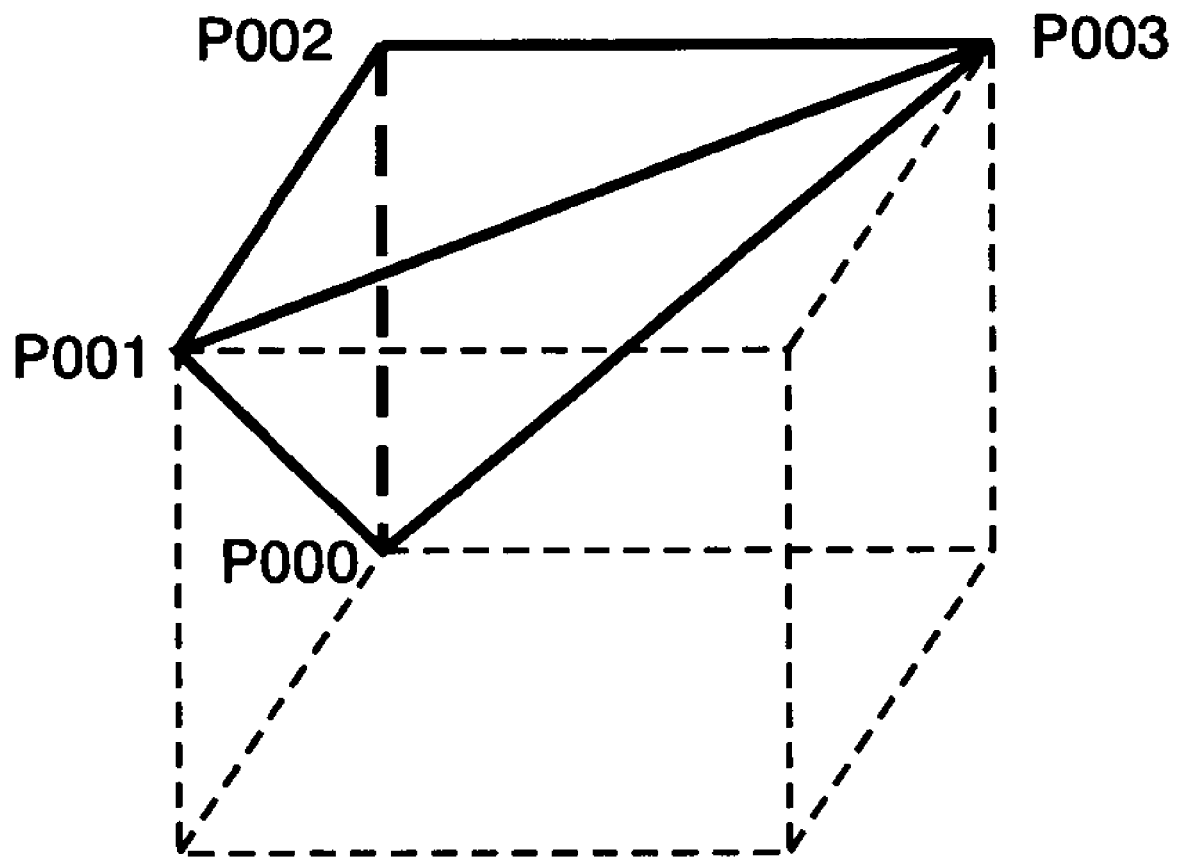

FIG. 3A illustrates graphical representations of an interpolation process 300 in accordance with the preferred and alternative embodiments. The process 300 depicted in FIG. 3A illustrates interpolation volumes of the method for alternative tri-linear interpolation scheme. FIG. 3B illustrates the six possible tetrahedron volumes T1 through T6 in for tetrahedral interpolation in accordance with the preferred and existing methods. Specific tetrahedral interpolation show the volume of particular tetrahedrons as obtained by rank ordering in accordance with the preferred method, indicating the four tetrahedral points used. FIGS. 3C-3E illustrate examples of additional tetrahedral volumes.

Based on the foregoing, it can be appreciated that by taking advantage of data-level parallelism in media processors (e.g., such as the INTEL MXP5800), i.e. if the tetrahedron points (usually 8-bit values per color channel) in the 3D lookup table are packed together in memory (as one 32-bit word, say), the interpolation computation can be implemented without extra instructions to unpack them. An algebraic manipulation of the interpolation equation allows computing the difference on the fraction coefficients instead of the tetrahedron node values.

Not only will the inventive technique described herein preserve the full precision without over or underflow, but the packed data from the 3D lookup can be used directly as is (without unpacking), thereby allowing a faster implementation of the color space transformation overall. This method has been implemented as part of a direct copy image path on a media processor. This method allows the implementation of the direct copy pipeline to work at the required performance rate as requested by the customer specifications. Without this method, the color space transformation performance would have failed to meet the required product design speed.

In order to take advantage of the media processor parallel instructions, and to make a more efficient calculation of the approximated output point, the algorithm can be slightly modified. For cost/performance reason, most media processors use a fixed HW precision arithmetic (8-bits, for example). Since the node values are 8-bit unsigned values, the result of the subtraction operations in the existing equation with reference to Table 1, generally requires 9 bits to preserve the full precision.

ited to 7-bit unsigned values, the result of a subtraction operation in this preferred method requires 8 bits of precision and thus can be implemented within the existing HW precision without any loss of accuracy. This makes it particularly appealing for use of dual instructions for the multiply-accumulate operations associated with the interpolation.

Rank-ordering the fractional values can be used to identify the specific tetrahedron which contains the mapped input point. The rank-ordering process can assure that the delta of the fractions is always a positive result due to the subtraction of a small number from a large number. This applies for any tetrahedron case out of the six possible tetrahedrons. Table 2 below shows the fractional delta values for all possible tetrahedrons. In the end, this leads to the use of unsigned dual (or quad) instructions in the computation of the interpolation output. Thus, the implementation of the tetrahedral interpolation stage in media processors with data-level parallelism can be efficiently computed following the definition of the last term in the modified formed equation and the delta values defined in Table 2 below.

This summarizes the sequence of steps that can be applied for all tetrahedrons. After using the fractional values to identify the tetrahedron that contains the mapped input point, the fractional delta values can be computed according to Table 2 below. Then the tetrahedron node values pairs CM and YK (if 16-bit words are packed together) or CMYK quad node values (if the packing is done on 32-bit words) can be retrieved from the 3D lookup table and used directly in the unsigned-dual (or quad) multiply-accumulate instructions that compute the interpolation outputs. Once the interpolation of the CMYK channels has been calculated, the interpolation outputs are packed together (as an outcome of the use of dual or quad instructions) and can be directly adjusted using a byte-to-byte mapping to implement additional 1D CMYK lookup tables to provide tone reproduction curves. These 1D lookup tables provide a means to linearize the main CMYK color interpolation table of node values with respect to the individual $\{C, M, Y, K\}$ color response. In addition, the 1D lookup tables can be used to compensate for changes in the individual $\{C, M, Y, K\}$ tone reproduction curve as the machine drifts over time and/or the level of toner/ink is depleted without having to re-adjust the tetrahedral node positions of the main color tables.

Table 2 below, for example illustrates the calculation of Fraction Delta Values with reference to the modified method.

TABLE 1

| Tetrahedron | Order in which node value Δs are computed | | |
|---|---|---|---|
| | ΔX | ΔY | ΔZ |
| 1 | P1-P0 | P2-P1 | P3-P2 |
| 2 | P1-P0 | P3-P2 | P2-P1 |
| 3 | P2-P1 | P3-P2 | P1-P0 |
| 4 | P2-P1 | P1-P0 | P3-P2 |
| 5 | P3-P2 | P1-P0 | P2-P1 |
| 6 | P3-P2 | P2-P1 | P1-P0 |

Thus a general loss of precision might occur when the existing equation is used as is. However, by re-organizing the existing equation in matrix form, there is an opportunity to take the subtraction on the fractional values rather than the tetrahedron node values. Since the fractional values are lim-

TABLE 2

| Tetra-hedron | Fraction order defining the tetrahedron | Delta computation on fraction | | | |
|---|---|---|---|---|---|
| | | Δ0 | Δ1 | Δ2 | Δ3 |
| 1 | Xfrc ≥ Yfrc ≥ Zfrc | 128-Xfrc | Xfrc-Yfrc | Yfrc-Zfrc | Zfrc |
| 2 | Xfrc ≥ Zfrc > Yfrc | 128-Xfrc | Xfrc-Zfrc | Zfrc-Yfrc | Yfrc |
| 3 | Zfrc > Xfrc ≥ Yfrc | 128-Zfrc | Zfrc-Xfrc | Xfrc-Yfrc | Yfrc |
| 4 | Yfrc > Xfrc ≥ Zfrc | 128-Yfrc | Yfrc-Xfrc | Xfrc-Zfrc | Zfrc |
| 5 | Yfrc ≥ Zfrc > Xfrc | 128-Yfrc | Yfrc-Zfrc | Zfrc-Xfrc | Xfrc |
| 6 | Zfrc > Yfrc > Xfrc | 128-Zfrc | Zfrc-Yfrc | Yfrc-Xfrc | Xfrc |

The alternative Interpolation computation equation is referred with the modified method is given as follows:

$$\text{Output}_i = 1/128[\Delta 0 * P0_i + \Delta 1 * P1_i + \Delta 2 * P2_i + \Delta 3 * P3_i]$$

Where i∈{C, M, Y, K}, $P0_i$, $P1_i$, $P2_i$, $P3_i$ are the four tetrahedron points, and Δ0, Δ1, Δ2, Δ3 are computed according to Table 2.

Note that embodiments can be implemented in the context of modules. Such modules may constitute hardware modules, such as, for example, electronic components of a computer system. Such modules may also constitute software modules. In the computer programming arts, a software module can be typically implemented as a collection of routines and data structures that performs particular tasks or implements a particular abstract data type.

Software modules generally are composed of two parts. First, a software module may list the constants, data types, variable, routines and the like that can be accessed by other modules or routines. Second, a software module can be configured as an implementation, which can be private (i.e., accessible perhaps only to the module), and that contains the source code that actually implements the routines or subroutines upon which the module is based. The term module, as utilized herein can therefore refer to software modules or implementations thereof. Such modules can be utilized separately or together to form a program product based on instruction media residing in a computer memory that can be implemented through signal-bearing media, including transmission media and recordable media, depending upon design considerations and media distribution goals. Such instruction media can thus be retrieved from the computer memory and processed via a processing unit, such as, for example, a microprocessor.

The system and/or method described above, for example, with respect to FIGS. 1-2 can be implemented as one or more such modules. Such modules can be referred to also as "instruction modules" and may be stored within a memory of a data-processing apparatus. Such instruction modules may be implemented in the context of a resulting program product (i.e., program "code"). Note that the term module and code can be utilized interchangeably herein to refer to the same device or media. Similarly, many of the features depicted in FIGS. 1-2 can be provided by or in the form of such modules.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A non-transitory computer-readable storage medium storing a computer program that, when executed, causes an image processing system to implement a method comprising:
   using rank-ordering of the fractional delta values to identify a tetrahedron that contains a mapped input point and calculating the formula $1/(2^{(n-1)})$ [Δ0*P0i+Δ1*P1i+Δ2*P2i+Δ3*P3i], where n represents the number of bits used, and the fractional delta values Δ0, Δ1, Δ2, Δ3 are computed according to the table:

| Tetra-hedron | Fraction order defining the tetrahedron | Delta computation on fraction fields | | | |
|---|---|---|---|---|---|
| | | Δ0 | Δ1 | Δ2 | Δ3 |
| 1 | Xfrc ≧ Yfrc ≧ Zfrc | 128-Xfrc | Xfrc-Yfrc | Yfrc-Zfrc | Zfrc |
| 2 | Xfrc ≧ Zfrc > Yfrc | 128-Xfrc | Xfrc-Zfrc | Zfrc-Yfrc | Yfrc |
| 3 | Zfrc > Xfrc ≧ Yfrc | 128-Zfrc | Zfrc-Xfrc | Xfrc-Yfrc | Yfrc |
| 4 | Yfrc > Xfrc ≧ Zfrc | 128-Yfrc | Yfrc-Xfrc | Xfrc-Zfrc | Zfrc |
| 5 | Yfrc ≧ Zfrc > Xfrc | 128-Yfrc | Yfrc-Zfrc | Zfrc-Xfrc | Xfrc |
| 6 | Zfrc > Yfrc > Xfrc | 128-Zfrc | Zfrc-Yfrc | Yfrc-Xfrc | Xfrc | retrieving tetrahedron node values in pairs such as CM and YK or as quad word CMYK from a 3D lookup table;
using the values directly in instructions that compute interpolation outputs;
packing interpolation outputs based on use of dual or quad instructions; and
adjusting packed interpolation output using a byte to byte mapping 1D TRC lookup tables.

2. A system for tetrahedral interpolation computations comprising:
   a memory containing packed tetrahedron points in a 3D lookup table;
   a media processor with data-level parallelism performing operational steps for implementing a basic functional architecture of tetrahedral interpolation computations on said tetrahedron points, wherein said tetrahedron points remain packed, utilizing an algebraically altered interpolation equation to produce fractional values, said fractional values being rank-ordered to identify a tetrahedron containing a mapped input point, wherein said equation comprises:
   $Output_i = 1/128 \ (128*P0_i + Xfrc*\Delta X_i + Yfrc*\Delta Y_i + Zfrc*\Delta Z_i)$ can be modified with a method of the change of the delta operation for the case of tetrahedron for the equations with matrix comprising:

$$Output_i = 1/128(128*P0_i + Xfrc*\Delta X_i + Yfrc*\Delta Y_i + Zfrc*\Delta Z_i)$$

$$= 1/128[\ 128 \quad Xfrc \quad Yfrc \quad Zfrc\ ] \begin{pmatrix} 1 & 0 & 0 & 0 \\ 0 & -1 & 1 & 0 \\ -1 & 1 & 0 & 0 \\ 0 & 0 & -1 & 1 \end{pmatrix} \begin{pmatrix} P0_i \\ P1_i \\ P2_i \\ P3_i \end{pmatrix}$$

$$= 1/128[128 - Yfrc\ Yfrc - Xfrc \quad Xfrc - Zfrc \quad Zfrc] \begin{pmatrix} P0_i \\ P1_i \\ P2_i \\ P3_i \end{pmatrix}$$

$$= 1/128[\Delta 0*P0_i + \Delta 1*P1_i + \Delta 2*P2_i + \Delta 3*P3_i]$$

Where {C, M, Y, K}, $P0_i$, $P1_i$, P2i, $P3_i$ are four tetrahedron points, and Δ0, Δ1, Δ2, Δ3 are computed according to Table 2; and
a direct media path on said media processor for implementation of a direct copy pipeline such that said system is able to function at a performance rate specified by a customer.

* * * * *